United States Patent
Shaffer

Patent Number: 5,969,499
Date of Patent: Oct. 19, 1999

[54] CONTROLLER FOR AC MOTOR

[76] Inventor: Randall A Shaffer, 1179 E. Pinion Oaks Dr., Prescott, Ariz. 86301

[21] Appl. No.: 09/146,824

[22] Filed: Sep. 4, 1998

Related U.S. Application Data

[60] Provisional application No. 60/058,410, Sep. 10, 1997.

[51] Int. Cl.⁶ ............................................. H02P 5/40
[52] U.S. Cl. ........................ 318/801; 318/800; 318/803; 318/807
[58] Field of Search .................... 318/779–832; 363/40; 364/150–178

[56] References Cited

U.S. PATENT DOCUMENTS

| | | | |
|---|---|---|---|
| 4,585,985 | 4/1986 | Bose | 318/803 |
| 4,777,422 | 10/1988 | Slicker et al. | 318/800 |
| 5,272,429 | 12/1993 | Lipo et al. | 318/808 |
| 5,334,923 | 8/1994 | Lorenz et al. | 318/805 |
| 5,386,186 | 1/1995 | Gritter | 318/798 |
| 5,689,169 | 11/1997 | Kerkman et al. | 318/807 |
| 5,689,170 | 11/1997 | Ishikawa | 318/811 |
| 5,694,017 | 12/1997 | Lansberry | 318/809 |
| 5,729,113 | 3/1998 | Jansen et al. | 318/779 |
| 5,757,954 | 5/1998 | Kuan et al. | 382/133 |
| 5,767,637 | 6/1998 | Lansberry | 318/146 |
| 5,811,957 | 9/1998 | Bose et al. | 318/802 |
| 5,861,728 | 1/1999 | Tazawa et al. | 318/778 |

*Primary Examiner*—Paul Ip
*Attorney, Agent, or Firm*—Joseph H. Roediger

[57] ABSTRACT

A speed controller for a three phase induction motor using sliding mode control to generate estimates of stator current and rotor flux to control motor speed. The controller receives only the actual operating speed and the desired operating speed as input signals. The controller establishes linked non-linear hyperplaces containing the operating points of each phase and coerces the operating points to move along the line of intersection. A change in operating conditions causes a change in the power supplied to the phase terminals.

15 Claims, 2 Drawing Sheets

CONTROLLER FOR AC MOTOR

This application claims the benefit of U.S. Provisional Application No. 60/058,410 filing date Sep. 10, 1997.

BACKGROUND OF THE INVENTION

This invention relates to a system and method of controlling the speed of an AC induction motor and, in particular, to a system using sliding mode control for the control of AC induction motor speed.

Due to present efforts directed to reducing the generation of atmospheric pollutants, the electric vehicle has received increasing interest as an alternative to the vehicle using a conventional internal combustion engine. Today, electric vehicles are beginning to enter the marketplace. These vehicles utilize centrally-located charging stations for recharging the DC power supplies used in the vehicle.

The advantages of an AC motor over the larger DC motor with its relatively complex structural requirements have favored the use of the AC motor as the driving element in the electric motor vehicle. For example, the induction motor needs no direct electrical connection to the rotor, thus eliminating the need for rotating electrical contacts. However, the speed control of the AC motor is recognized as a problem in that a motor controller is required to sense, compute and correct currents in a dynamic system having hysteresis, inertia and other time limiting responses. As a result, the controller of the AC induction motor is continually trying to provide the appropriate current for each phase of a multiphase AC motor under very demanding operating conditions.

Among the different approaches taken to provide effective motor current control is the use of analog comparators to compare actual motor currents with reference currents that are generated by the motor controller. The resultant difference signals are used to control the power supply circuits which generate the phase currents delivered to the phase terminals of the motor. The pulse width of the power supplied to the motor for each phase is a function of the difference signal provided by the analog comparator for each phase. This type of controller uses pulse-width modulated inverter circuits, one for each phase, to supply the power to the motor terminals.

Another approach to the provision of a controller for a multiphase AC motor utilizes digital circuits to generate a digital difference signal for each phase based on a comparison of the actual phase current and a desired phase current computed by a programmable logic circuit. The logic circuit also establishes a band in which the digital difference signals are to be maintained. This type of motor controller requires the sensing of actual phase currents to permit a comparison to be made and to then generate the signals to effectively control the inverter circuits which provide power to the motor phase terminals. This type of controller utilizes both analog and digital circuitry to sense when negative or positive signals are to be supplied to the individual phase windings of the motor.

Accordingly, the present invention is directed to a motor controller for use in connection with an AC motor in which the need to sense the phase currents or the rotor flux in the motor is eliminated. Further, the present invention provides a motor controller for an AC motor in which the only quantities that are monitored are the desired speed and the actual motor speed. The subject controller provides accurate and rapid motor control without relying on the use of analog monitoring components for sensing current or flux in the motor. In addition, the present controller operates to control the motor speed essentially independently of loading of the motor.

SUMMARY OF THE INVENTION

This invention relates to a novel controller for an AC motor which utilizes sliding mode control to estimate the stator current and the rotor flux for the three phases of the motor based on actual motor speed, the reference or desired speed and the manufacturer's specifications outlining the motor performance characteristics. This controller receives as input signals only the actual operating speed and the desired or reference speed which are transformed in microprocessors in accordance with stored and estimated operating parameters and used to operate an inverter circuit. The inverter circuit has an output connected to each phase terminal of the motor and sequentially applies a positive signal to the individual phase terminals as required for control of motor speed.

The controller utilizes several components including a reactive torque reference memory device which receives and stores, prior to motor operation, the motor operating parameters set forth in the manufacturer's specifications. These operating parameters include the resistance and inductance values for the rotor and stator, the mutual inductance between rotor and stator and the rotor inertia for the manufacturer's rated motor speed. When the AC motor coupled to the novel controller is in operation, the desired operating speed of the motor is continually supplied to the torque reference memory device. The stored operating parameters along with the actual operating speed are supplied to a first microprocessor in the controller. The first microprocessor is programmed to calculate and provide solutions to three equations. The three signals generated by the first microprocessor from the application of the operating parameters and the desired operating speed thereto are determined in part by the application of five estimated quantities provided by a second microprocessor.

The second microprocessor, herein termed the estimator, provides signals to the first microprocessor which are estimated values of the stator currents, both the direct and quadrature components, and the rotor flux, both direct and quadrature components, along with an estimate of motor speed. It is to be noted that the first microprocessor receives a continual reading of actual motor speed as monitored by the present controller. The estimator does not receive this signal. The first microprocessor is programmed to calculate three equations which generate three output signals which are supplied to a math processor. The signals undergo transformation in the math processor to control the switching logic of an inverter circuit. The inverter circuit has individual output terminals that are each coupled to a phase terminal of the motor.

The present motor controller utilizes sliding mode control to derive the digital control signals for the inverter needed to coerce the motor to follow a prescribed trajectory or operating path. The operating performance of each phase of an AC motor is a continuum of operating points contained in a hyperplane which is linked to the hyperplanes of the other phases. The goal of sliding mode control is to coerce the operating points of each motor phase to move on each hyperplane to the common intersectional line between hyperplanes. Then, the operating points are urged to move along the common intersectional line. In this invention, it is the first microprocessor that defines the hyperplanes and locates the estimated operating points thereon based on the inputs from the estimator, the actual and desired motor speed and the data contained in the torque reference memory.

The common intersectional line defined by the linked hyperplanes is an attractor for actual motor operating conditions. An attractor defines a stable state of operation for the motor wherein the stator currents and rotor flux are sinusoidal for the desired speed. When the motor speed is undergoing change by the operator of the vehicle or other equipment employing the motor, the intersection of the hyperplanes changes. As a result, the operating conditions of the motor must then change to allow the motor to operate on the newly-defined line of intersection. The present motor controller causes the required changes by generating estimates of all of the operating state variables. The second microprocessor or estimator performs the estimating of five variables indicative of the two stator current components, the two rotor flux components and the nominal rotor speed. These five signals from the estimator are used by the first microprocessor to define the three intersecting hyperplanes. The hyperplanes so defined are changed to reflect changes in either the actual or desired motor speed signals. Signals for the solution of equations defining two of the hyperplanes are supplied to a mathematical processor which provides two signals to control the inverter since only two of the equations are necessary to define the intersectional line serving as the attractor. The signal from the solution to the third equation defining the remaining hyperplane is provided to the second microprocessor to establish the sign of any change in the estimated quantities. The mathematical processor generates the three inverter control signals from the equations defining the hyperplanes and also provides input signals to the second microprocessor for establishing the five estimated quantities supplied to the first microprocessor.

The present invention utilizes the first and second microprocessors and the mathematical processor to operate on the basis that the three phase motor and inverter circuit can be characterized as possessing a variable structure. The switching action providing power as necessary to the motor phase terminals is based on the estimated values of motor currents, phases and speed plus the observation of actual motor speed. As mentioned, the equations which determine the operation of the inverter circuit define hyperplanes which are nonlinear functions as is the intersectional line therebetween. These hyperplanes take into account all of the operating variables in motor operation without requiring the measurement of current or flux in the motor thus enabling accurate motor control to be achieved by monitoring actual rotor speed and inputting only the desired or reference motor speed.

Further features and advantages of the invention will become more readily apparent from the following detailed description of the invention when taken in conjunction with the accompanying drawings.

DESCRIPTION OF THE PREFERRED EMBODIMENT

Figure 1:
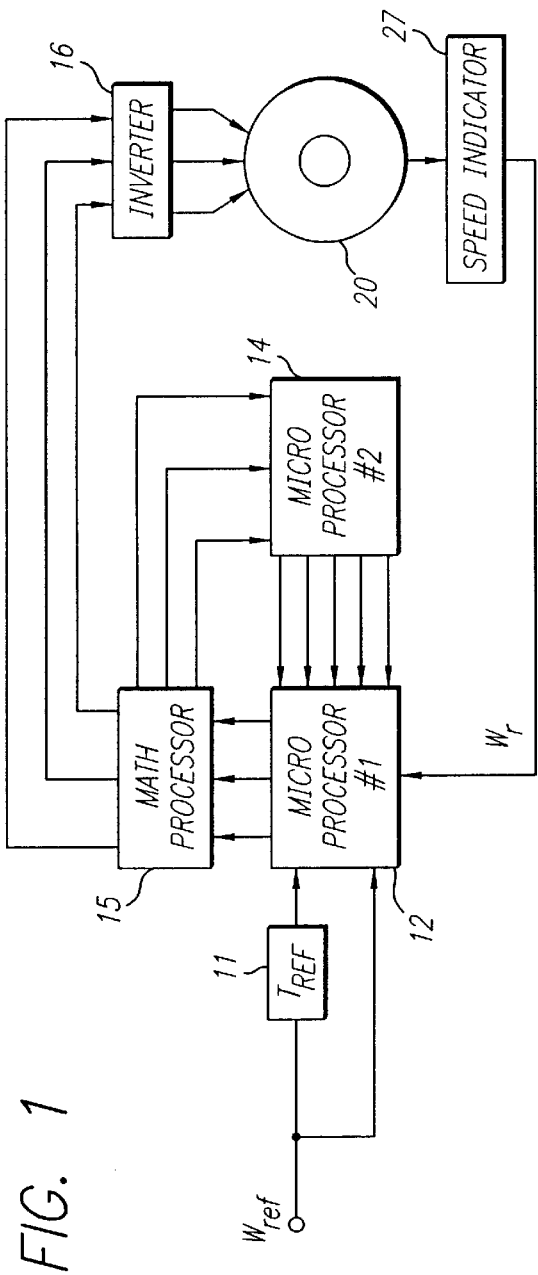
FIG. 1 is a block schematic diagram of the present invention coupled to an induction motor.

The subject of the present invention is a controller for an AC induction motor which is constructed to operate in a sliding mode. A system operating in a sliding mode has dynamics that are described by surfaces in state space called hyperplanes. Hyperplanes which are developed from the estimated components of stator current and rotor flux along with rotor speed are nonlinear and do not require the monitoring of rotor acceleration or time derivatives of flux which are difficult to obtain from a dynamic system. Taking it one step further, the present controller employs microprocessor circuitry to estimate the state variables of the motor and develop the nonlinear hyperplanes for the three phases. Thus, the present controller does not require the complicated analog circuitry to monitor currents and flux heretofore used in other controllers.

The nonlinear hyperplanes intersect to define the line serving as the attractor. It is on this line that the individual operating points are to be urged to reside. This line or curve is a trajectory of the motor operating states, each of which comprises an individual point. The controller coerces or moves the operating point for each phase to the intersection of the planes and maintains the motor operation on the trajectory. The trajectory is an attractor in that each point on the trajectory represents a stable point of operation wherein the current and flux are sinusoidal and the motor speed is as demanded. Changing the speed changes the line of intersection of the planes so that the controller must then operate to urge the motor to again operate along the trajectory.

To accomplish sliding mode control with nonlinear hyperplanes, the present controller comprises a torque reference storage device, first and second microprocessors, a mathematics processor and an inverter for providing a square wave signal to each phase terminal on the induction motor. The controller is shown in block schematic form in FIG. 1 with the torque reference device 11 receiving the desired or reference motor speed $W_{ref}$ as an input signal, typically from an analog to digital converter.

The torque reference device 11 has programmed therein the nominal motor constant values taken from the manufacturer specifications. The stored values include the stator resistance and inductance, the rotor resistance and inductance, and the mutual inductance between rotor and stator and rotor inertia. The nominal motor constant values are stored in a RAM in the torque reference device which also includes a processor circuit to produce a digital signal to be supplied to the first microprocessor 12. The digital signal is speed dependent based on the operator changing the desired motor speed $W_{ref}$ as conditions require. The torque reference device provides its signal to the first microprocessor 12 in accordance with the following expression:

$$T_{ref} = \frac{L_m}{R_s^2 + W^2_{ref}L_s^2} \cdot V_m^2$$

Where $L_m$ is the mutual inductance, $R_s$ and $L_s$ are the stator resistance and inductance and $V_m$ is the voltage from the inverter circuit. In addition to the $T_{ref}$ and the $W_{ref}$ signals, the first microprocessor receives the $W_r$ signal indicating the actual rotor speed of motor 20 and the first five estimate signals from the second microprocessor 14. The actual rotor speed is monitored by a speed indicator 21 such a an optical encoder or Hall-effect sensor to generate a digital $W_r$ signal for the first microprocessor.

The first microprocessor 12 defines the three points with reference to the three hyperplanes using the input signals as shown in FIG. 1 and supplies the signals to math processor 15 where they are transformed into the inverter control signals. In discussing the operation of the first microprocessor, the program for the operations performed thereby generates three signals at each time of inquiry. When the computations are performed every 0.35 milliseconds, the motor speed was maintained at the desired $W_{ref}$ with one percent accuracy. The microprocessor 12 is programmed to calculate the three equations each of which defines the non linear hyperplane containing the possible operating points of a motor phase.

The hyperplanes are computed in microprocessor 12 taking into account the five input signals provided by the second microprocessor 14, referred to herein as the estimator. The three nonlinear hyperplanes are linked and intersect in state space to provide a line of intersection. The operational point of each phase is coerced to slide or move within the hyperplane to the common intersectional line. The mathematical model of an induction motor suggests that five quantities are significant in determining its operation. The quantities are the two current variables corresponding to the direct and quadrature components of the stator current, two magnetic flux variables corresponding to the direct and quadrature components of the rotor flux and the rotor speed. Since the present invention does not monitor the actual current and flux components, the second microprocessor generates estimated values for these quantities. The estimated values are derived without consideration of changes in motor operating parameters except as manifested in a change of rotor speed which redefines the three hyperplane equations and the resultant signals from the first microprocessor. As shown in FIG. 1, the estimator receives three hyperplane signals from the math processor 15 which has transformed the hyperplane signals from the first microprocessor to signals which control the switching logic of the inverter circuit 16. The processor also transforms the hyperplane equations into three reference signals for the estimator. The reference signals are solutions of estimated direct and quadrature equations and a velocity difference equation to show the direction of change in rotor speed.

The math processor 15 provides three control signals for the inverter circuit 16, one for each phase of the induction motor 20. The control signals each relate to a hyperplane for a single phase. As mentioned, the hyperplanes are nonlinear and intersect to provide the line on which operation of the motor at varying speeds is to be confined by the controller. The intersectional line is considered as the trajectory of the points defining the operation of the motor over a period of time and the goal of the present invention is to define the hyperplanes which establish the trajectory, estimate the current, flux and speed conditions, consider the actual rotor speed compared with the desired or reference speed and redefine the hyperplanes, if necessary, without measuring actual currents and flux. Changes in the hyperplanes result in changes in the intersectional line therebetween requiring that the operating point each phase of the motor be coerced so that its trajectory coincides with the intersectional line. The coercion of the motor operating condition is brought about by altering the square wave input signals $V_m$ applied to each phase of the motor. The signals are nominally 120 degrees out of phase with the timing of each square wave being controlled by the corresponding one of the three signals from the math processor.

Figure 2:
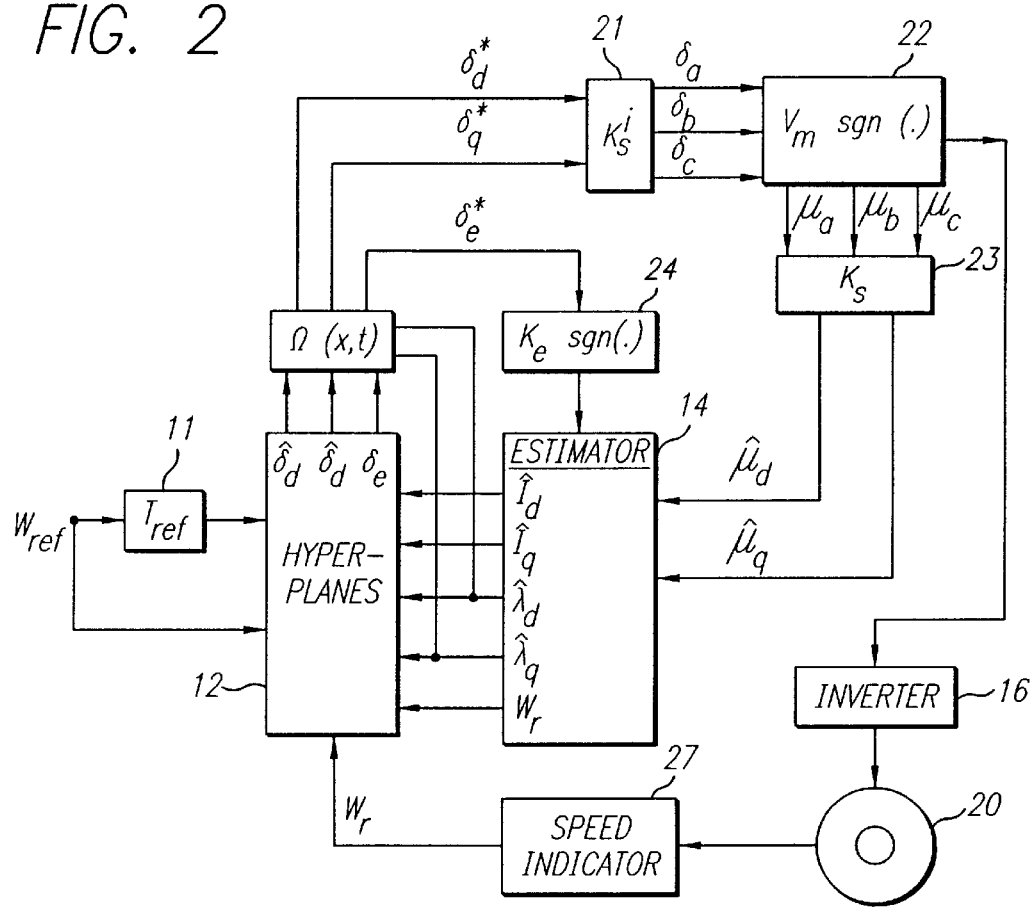
FIG. 2 is a block functional diagram of the embodiment of FIG. 1 showing the quantities used in establishing sliding mode control of the motor.

The block diagram of FIG. 2 further describes the operation of the first and second microprocessors 12, 14 and the math processor 15. As noted previously, the torque reference device stores the nominal motor values from the manufacturer specifications and provides a signal to the first microprocessor 12 which varies only with changes in the desired or reference motor speed. The first microprocessor receives digital signals corresponding to the desired and actual speeds $W_{ref}$ and $W_r$, as well as five signals from the estimator. The five signals are shown in the estimator block 14 with a carat as a superscript denoting an estimated value. Since the estimated values are used in the first microprocessor to define the operating point of the motor on the hyperplanes, two hyperplane notations in block 12 are characterized with a carat. The third quantity is different in that it is indicative of the difference between the estimated rotor speed and the actual rotor speed. The definition of the hyperplane vector provided by the first microprocessor is expressed in columnar form as follows:

$$\begin{vmatrix} \hat{\delta}_d \\ \hat{\delta}_q \\ \delta_e \end{vmatrix} = \begin{vmatrix} \hat{\lambda}_d \hat{\imath}_d + \hat{\lambda}_q \hat{\imath}_q - T_{ref} \\ \hat{\lambda}_d \hat{\imath}_q - \hat{\lambda}_q \hat{\imath}_d + W_r - W_{ref} \\ \hat{W}_r - W_r \end{vmatrix}$$

The $W_r$ and $W_{ref}$ quantities are directly read operating signals while the five quantities denoted by a carat are estimated quantities provided by the second microprocessor.

The three hyperplane equations are supplied to the math processor wherein they are transformed twice to control the switching logic of the inverter. The first transformation expressed as $\Omega(x, t)$ utilizes the following transformation matrix $$\begin{vmatrix} \lambda_{d-} & \lambda_q & \lambda_g \\ \lambda_q & \lambda_d & -\lambda_d \\ 0 & 0 & b\lambda^2_r \end{vmatrix}$$

wherein b is a constant equal to $$\frac{L_r}{L_r L_s - L_m^2}, \text{ and } \hat{\lambda}_r^2$$

is the sum of the estimated flux quantities $\lambda_d^2 + \lambda_q^2$ to define the transformed hyperplanes. The first two hyperplanes are used for controlling the motor and therefore are transformed to control the three phase stator circuit. The transformation is described by developing equations for the three switching surfaces using the constant matrix of $K_s^i$ block 21 in the math processor 15. The resultant switching surfaces $\delta_a$, $\delta_b$, and $\delta_c$ are termed the phase hyperplanes and are described as set forth:

$$\begin{vmatrix} \hat{\delta}_a \\ \hat{\delta}_b \\ \hat{\delta}_c \end{vmatrix} = \begin{vmatrix} 0 & 1 \\ \frac{\sqrt{3}}{2} & -\frac{1}{2} \\ \sqrt{\frac{3}{2}} & -\frac{1}{2} \end{vmatrix} \begin{vmatrix} \hat{\lambda}_d & -\hat{\lambda}_q & c\hat{\lambda}_q \\ \hat{\lambda}_q & \hat{\lambda}_d & -c\hat{\lambda}_d \end{vmatrix} \begin{vmatrix} \hat{\delta}_d \\ \hat{\delta}_q \\ \delta_e \end{vmatrix}$$

It is to be noted that these switching surfaces include reference to actual rotor speed and thus are not solely based on estimation.

The block 22 denoted $V_{msgn}$ determines if a positive or negative correction is to be applied to the phase terminal of the motor in order to maintain the operation of the motor on the trajectory of operating points defined by the intersectional line. The sign of the correction is determined from the time rate of change of each phase hyperplane. The control signals from the $V_{msgn}$ block are supplied to the inverter circuit. In addition, the control signals are converted in the $V_{msgn}$ block 22 to provide phase control signals $\mu_a$, $\mu_b$ and $\mu_c$ which are then transformed in $K_s$ block 23 to the two reference control signals $\mu_d$ and $\mu_Q$ for the estimator 14.

The constant $K_s$ is shown in matrix form in the equation for the direct and quadrature hyperplanes as shown:

$$\begin{vmatrix} \hat{\mu}_d \\ \hat{\mu}_q \end{vmatrix} = \begin{vmatrix} 0 & -1/\sqrt{3} & 1/\sqrt{3} \\ 2/3 & -1/2 & -1/2 \end{vmatrix} \begin{vmatrix} \mu_a \\ \mu_b \\ \mu_c \end{vmatrix}$$

The estimator receives an input signal from the $K_{esgn}$ block indicating the sign of the changes in the difference between the estimated rotor speed and the actual rotor speed. The $\delta_e$ signal is an error signal, the derivative of which is supplied to the estimator to be used in generating the estimates of the five current, flux and speed quantities provided to the first microprocessor.

The estimator serves to provide a simplified model of the motor. Typically, the equations describing the operation of the induction motor number eight in that three are used for the current, three are used for the flux, and one each for the angle of the rotor and the rotor speed. The model provided by the estimator of the present invention utilizes the five variables: direct and quadrature current, direct and quadrature flux and the rotor speed. These five quantities are estimated from the derivative of the state vector influenced by the two phase signals $\mu_d$ and $\mu_q$ from the $K_s$ block 23 along with the sign change signal from the $K_e$ block 24. The equation of the derivative of the state vector is expressed as $x=f(x,t)+B_u$ wherein $$f(x, t) = \begin{bmatrix} a_{11} I_d + \omega I_q + a_{12}\lambda_d + a_{13}\omega_r\lambda_q \\ a_{11} I_q - \omega I_d + a_{12}\lambda_q - a_{13}\omega_r\lambda_d \\ a_{21} I_d + a_{22}\lambda_d + (\omega - \omega_r)\lambda_q \\ a_{21} I_q + a_{22}\lambda_q - (\omega - \omega_r)\lambda_d \\ a_{31}(T_e - T_L) \end{bmatrix},$$

$$x = \begin{bmatrix} I_d \\ I_q \\ \lambda_d \\ \lambda_q \\ \omega_r \end{bmatrix}, u = \begin{bmatrix} u_d \\ u_q \end{bmatrix}, B = \begin{bmatrix} b_1 & 0 \\ 0 & b_1 \\ 0 & 0 \\ 0 & 0 \\ 0 & 0 \end{bmatrix},$$

$$a_{11} = -\frac{L_r^2 R_s + L_m^2 R_r}{DL_r}, a_{12} = \frac{L_m}{D}\frac{R_r}{L_r}, a_{13} = \frac{L_m}{D},$$

$$a_{21} = \frac{L_m}{L_r} R_r, a_{22} = -\frac{R_r}{L_r}, a_{31} = \frac{P}{2I},$$

$$b_1 = \frac{L_r}{D}, D = L_r L_s - L_m^2.$$

The constants are calculated from the nominal motor specifications provided by the manufacturer. The estimator using the instant control conditions estimates the present current, flux, and speed conditions to enable the first microprocessor to define the operating point on the intersection of the hyperplanes.

In other terms, the first and second microprocessors, the torque reference device and the math processor of FIG. 1 are comprised of random-access memory and a microprocessor chip. The torque reference device provides a digital number having the physical units of torque to the first microprocessor. This microprocessor receives digital numbers for actual rotor speed and desired rotor speed along with five numerical signals from the second microprocessor. The five numerical signals are estimates of the operating conditions for each phase of the motor. The faster the rate at which these signals are generated, the better the accuracy of control of motor speed.

The data received by the first microprocessor results in three floating point numbers being generated at each sampling time. These numbers indicate the position of the operating point of the motor with regard to the intersectional line of the three hyperplanes defined by the equations stored in the first microprocessor. Thus, the three signals indicate the estimated deviation of the operating condition from the desired condition. It is to be noted that the trajectory or curve traced by the operating points change as conditions change. In order to coerce the phase operating conditions to slide along the hyperplane to the common intersectional line, the estimated operating conditions are transformed by the math processor into the individual phase signals. Each signal is used to control the timing of the application of the phase voltage to the corresponding terminal of the motor.

A change in the operating speed redefines the nonlinear hyperplanes of motor operation. The controller is responsive to changes in both the desired or reference speed and the actual operating speed to move the phase operating points on the newly defined plane to the intersectional line. As a result, both speed quantities are continuously sampled and provided to the first microprocessor as shown in FIGS. 1 and 2.

Figure 4:
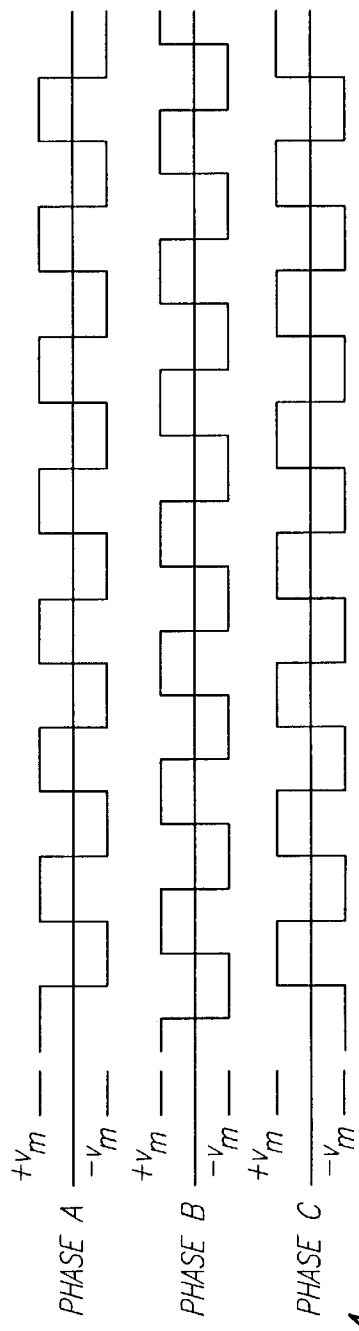
FIG. 4 is a timing diagram showing the motor phase voltages for the embodiment of FIG. 1.
Figure 3:
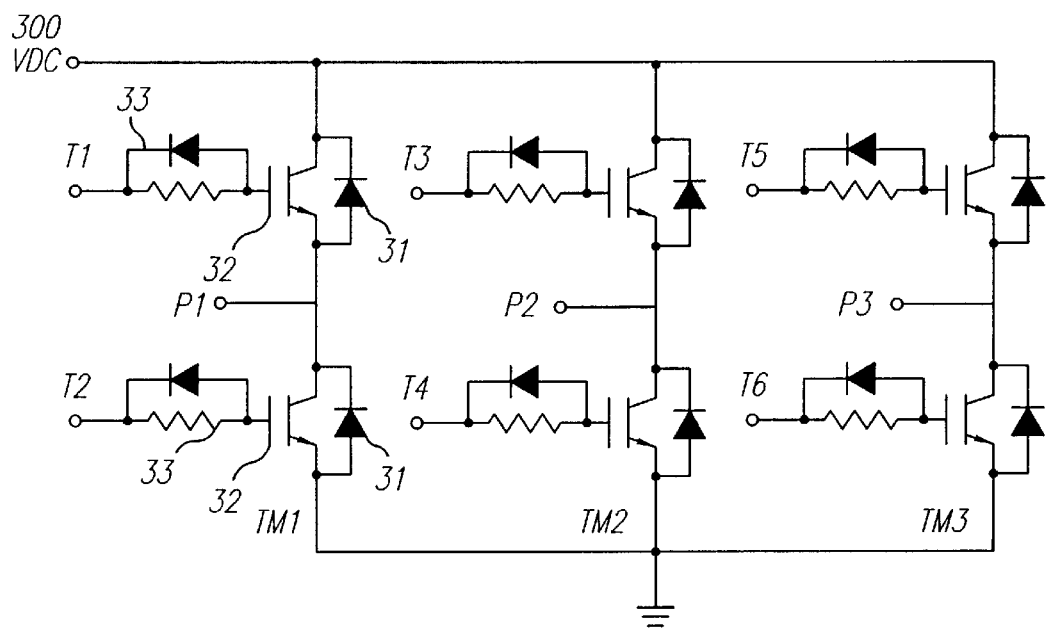
FIG. 3 is an electrical schematic diagram of the inverter of FIG. 1.

The phase voltage waveforms are shown in FIG. 4 as square waves varying between $+V_m$ and zero with $V_m$ equal to 300$_v$ in the embodiment shown. The three waveforms are nominally 120 degrees out of phase. The digital signals used to control the inverter power switch circuitry shown in FIG. 3 are provided by the math processor 15. The digital drive signals are complementary pairs of signals for application to terminal pairs $T_1$ $T_2$, $T_3$ $T_4$, and $T_5$, $T_6$ of FIG. 3. In operation, a positive signal applied to terminal $T_1$ is accompanied by a negative signal to terminal $T_2$. As a result, the signal at phase terminal $P_1$ switches between 300 volts and ground. The timing of the transitions determines the amount of power supplied to the corresponding phase winding of the stator and thus can change the current and flux as well as influence the rotor speed. The inverter power switch circuit of FIG. 3 has particular advantages associated with its use in that a clamping diode 31 is provided across each power transistor 32 to divert inductive energy stored in the motor phase windings back into the supply battery. In addition, diode-resistor networks 33 are connected to the gate of each power transistor to provide a difference between the turn-off and turn-on times of the ground-referenced inverter devices and the floating microprocessors of the controller. In operation, the resistor provides a delay in turn-on by limiting the charging current to the power transistor when the voltage applied is positive. When the applied voltage is zero, the diode allows a fast discharge of the gate capacitance of the transistor turns off in a shorter time than required for turn-on.

In one embodiment of the invention successfully tested and operated, the desired or reference speed of a Model CM 3546T horsepower three phase induction motor manufactured by Baldor Electric Company was varied from 450 to 3000 rpm. The computed theoretical frequency of the for different speeds was compared with the measured fundamental frequency the phase current over a wide range of speeds. A summary of the results is set forth below.

| Speed Reference (RPM) | Theoretical Current Frequency (Hz) | Measured Fundamental Frequency (Hz) | Percent Difference |
| --- | --- | --- | --- |
| 450 | 15 | 15.31 | 2.1% |
| 900 | 30 | 30.21 | 0.7% |
| 1350 | 45 | 45.56 | 1.2% |
| 1800 | 60 | 60.61 | 1.0% |
| 2250 | 75 | 76.63 | 2.2% |
| 3000 | 100 | 96.62 | 3.4% |

Figure 5:
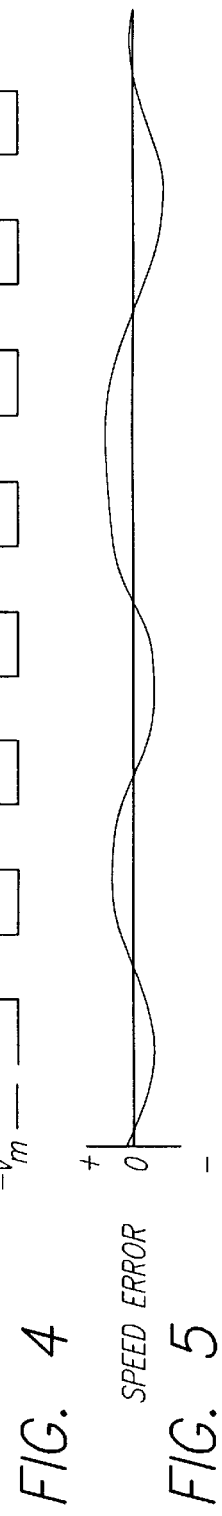
FIG. 5 is a wave form diagram showing the speed error condition for the motor controller of FIG. 1.

The speed error which represents the difference between desired and actual speeds is shown in FIG. 5 as varying above and below the desired speed for normal operation. The speed error is determined in part by the sampling rate. For a sampling rate of every 0.35 milliseconds, the controller was found to provide a 1% error over a dynamic operating range including operating speeds well in excess of the rated synchronous speed.

The test data has demonstrated that the present speed controller reacts appropriately to mechanical and electrical parameter variations and to load torque disturbances. The results also confirm that the sliding mode dynamic operation occurs with the present invention and that the phase currents are essentially sinusoidal. The fundamental frequency components of the phase currents as measured confirm the rotor speed measurements and are consistent with the desired or reference speed.

While the above description has referred to a specific embodiment of the invention, it is recognized that variations and modifications may be made therein without departing from the scope of the invention as claimed.

What is claimed:

1. A control system for a three phase induction motor for controlling motor speed in response to a speed command signal comprising:
    a) a reference memory for storing the motor operating parameters therein;
    b) means for providing a speed command signal to the reference memory;
    c) a first microprocessor programmed to define three hyperplanes and providing three output signals wherein each output signal represents an estimated operating point for one phase of the motor;
    d) means for providing an actual speed signal to the first microprocessor;
    e) a second microprocessor programmed to define a plurality of estimated operating state variables of the motor and provide corresponding signals to the first microprocessor;
    f) a math processor for receiving the output signals of the first microprocessor and generating three control signals, said math processor further providing input signals to the second microprocessor which represent change in the three defined hyperplanes, and
    g) circuit means for receiving the control signals from the math processor and providing a motor control signal to each phase of the motor.

2. The control system of claim 1 wherein said first microprocessor is programmed to define three nonlinear hyperplanes.

3. The control system of claim 2 wherein said reference memory stores nominal motor values for stator resistance and reductance, rotor resistance and inductance, the mutual inductance between rotor and stator, and the rotor inertia.

4. The control system of claim 3 wherein said second microprocessor defines five estimated operating state variables and provides five corresponding signals to the first microprocessor.

5. The control system of claim 4 wherein said five estimated operating state variables represent the direct and quadrature components of the stator current and rotor flux, and the rotor speed.

6. The control system of claim 5 wherein the math processor transforms the three output signals from the first microprocessor into three input signals provided to the second microprocessor, said input signals including one signal indicating the direction of change in rotor speed.

7. The control system of claim 6 wherein said circuit means comprises an inverter power switch for generating three motor control signals, said motor control signals being provided as square waveforms with a nominal 120 degrees phase difference therebetween.

8. The control system of claim 6 wherein said means for providing an actual speed signal operates at a rate of about 0.35 milliseconds.

9. A method of controlling the speed of an induction motor based on estimated values of stator current, rotor flux and rotor speed wherein an inverter circuit provides power to the phase terminals of the motor, said method comprising the following steps:
    a) storing the nominal operating parameters of the motor in a reference memory;
    b) receiving a desired speed signal and generating a torque reference signal from the stored nominal operating parameters;
    c) establishing intersecting hyperplanes, each hyperplane defining the operating performance of a phase of the motor, said hyperplanes forming a line of intersection containing the dynamic operating range of the motor;
    d) monitoring the actual rotor speed of the motor;
    e) reestablishing the intersecting hyperplanes based on estimated operating state variables of the motor and the actual rotor speed to provide a redefined line of intersection; and
    f) modifying the power provided to the phase terminals to place the operating point of the motor on the redefined line of intersection whereby the actual rotor speed is in substantial conformance with the desired speed.

10. The method of controlling the speed of an induction motor of claim 9 wherein the step of reestablishing the intersecting hyperplanes is based on estimated values for stator current, rotor flux and rotor speed.

11. The method of controlling the speed of an induction motor of claim 10 wherein the step of establishing hyperplanes provides for three hyperplanes forming a line of intersection.

12. The method of controlling the speed of an induction motor of claim 11 wherein, in said (b) step, the torque reference signal is obtained by the equation $$T_{ref} = \frac{L_m}{R_s^2 + W^2_{ref} \cdot L_s^2} \cdot V_m^2.$$

13. The method of controlling the speed of an induction motor of claim 12 wherein, in said (c) step, the hyperplanes established are defined as follows:

$$\begin{vmatrix} \hat{\delta}_d \\ \hat{\delta}_q \\ \delta_e \end{vmatrix} = \begin{vmatrix} \hat{\lambda}_d \hat{I}_d + \hat{\lambda}_q \hat{I}_q - T_{ref} \\ \hat{\lambda}_d \hat{I}_q - \hat{\lambda}_q \hat{I}_d + W_r - W_{ref} \\ \hat{W}_r - W_r \end{vmatrix}.$$

14. The method of controlling the speed of an induction motor of claim 13 wherein, in said (e) step, the intersecting hyperplanes are reestablished based on estimates of the direct and quadrature components of the stator current and rotor flux, and the rotor speed.

15. The method of controlling the speed of an induction motor of claim 14 wherein the estimates of the five quantities are made from the derivative of the vector of each quantity.

* * * * *